US010755037B1

(12) United States Patent
Lewis et al.

(10) Patent No.: US 10,755,037 B1
(45) Date of Patent: *Aug. 25, 2020

(54) MEDIA OBJECT ANNOTATION WITH INTERACTIVE ELEMENTS

(71) Applicant: Google Inc., Mountain View, CA (US)

(72) Inventors: Justin Lewis, Marina Del Rey, CA (US); Jonathan William Ray, Venice, CA (US)

(73) Assignee: Google LLC, Mountain View, CA (US)

( * ) Notice: Subject to any disclaimer, the term of this patent is extended or adjusted under 35 U.S.C. 154(b) by 268 days.

This patent is subject to a terminal disclaimer.

(21) Appl. No.: 15/804,917

(22) Filed: Nov. 6, 2017

Related U.S. Application Data

(63) Continuation of application No. 14/264,885, filed on Apr. 29, 2014, now Pat. No. 9,811,514.

(51) Int. Cl.
```
G06F 40/169    (2020.01)
H04L 29/06     (2006.01)
G06F 3/0482    (2013.01)
G06F 16/78     (2019.01)
```

(52) U.S. Cl.
CPC .......... *G06F 40/169* (2020.01); *G06F 3/0482* (2013.01); *G06F 16/7867* (2019.01); *H04L 65/403* (2013.01)

(58) Field of Classification Search
None
See application file for complete search history.

(56) References Cited

U.S. PATENT DOCUMENTS

| | | | |
|---|---|---|---|
| 6,232,972 B1 | 5/2001 | Arcuri et al. | |
| 7,443,418 B2* | 10/2008 | Bryant | G06Q 40/04 348/207.1 |
| 7,689,682 B1* | 3/2010 | Eldering | G06Q 40/00 709/223 |
| 2003/0122839 A1* | 7/2003 | Matraszek | G06F 16/58 345/581 |
| 2003/0160770 A1 | 8/2003 | Zimmerman | |
| 2004/0119757 A1 | 6/2004 | Corley et al. | |
| 2006/0107289 A1* | 5/2006 | De Yonker | G11B 27/105 725/37 |
| 2008/0060013 A1 | 3/2008 | Sarukkai et al. | |
| 2008/0165153 A1* | 7/2008 | Platzer | G06F 1/1626 345/173 |
| 2008/0276269 A1 | 11/2008 | Miller et al. | |
| 2009/0158326 A1 | 6/2009 | Hunt et al. | |
| 2011/0258526 A1* | 10/2011 | Supakkul | G06F 16/958 715/230 |

(Continued)

*Primary Examiner* — Howard Cortes
(74) *Attorney, Agent, or Firm* — Lowenstein Sandler LLP

(57) ABSTRACT

A method and system is disclosed that determines whether a content item viewed by a user has been approved by the user. Responsive to determining that the content item has been approved by the user, the method and system select a share interactive element to display with a graphical representation of the content item to allow the content item to be shared with one or more other users in any of a plurality of content networks. The method and system annotate the graphical representation of the content item with share interactive element. The method and system further provide, by a processor, the graphical representation of the content item with the share interactive element for display on a media device.

20 Claims, 10 Drawing Sheets

(56) References Cited

U.S. PATENT DOCUMENTS

| | | |
|---|---|---|
| 2011/0264532 A1 | 10/2011 | Chan et al. |
| 2012/0039513 A1 | 2/2012 | Kennedy et al. |
| 2013/0041893 A1 | 2/2013 | Strike |
| 2013/0142418 A1* | 6/2013 | van Zwol .......... G06K 9/00751 |
| | | 382/159 |
| 2014/0053206 A1* | 2/2014 | Shoykher ................ G06F 3/017 |
| | | 725/50 |
| 2014/0067828 A1 | 3/2014 | Archibong et al. |
| 2014/0075307 A1* | 3/2014 | Bargas ............... H04N 21/2743 |
| | | 715/716 |
| 2014/0082476 A1 | 3/2014 | Lundqvist et al. |
| 2014/0129627 A1* | 5/2014 | Baldwin ................ H04L 67/306 |
| | | 709/204 |
| 2014/0199045 A1* | 7/2014 | Lee ........................ H04N 5/783 |
| | | 386/240 |
| 2014/0364228 A1* | 12/2014 | Rimon .................... A63F 13/12 |
| | | 463/32 |
| 2014/0380354 A1* | 12/2014 | Relyea ............. H04N 21/44222 |
| | | 725/32 |
| 2015/0089384 A1* | 3/2015 | Lewis ................... G06F 3/0482 |
| | | 715/745 |
| 2015/0177954 A1* | 6/2015 | Wei ....................... G06F 3/0482 |
| | | 715/738 |
| 2015/0220500 A1* | 8/2015 | Katic .................... G06F 16/957 |
| | | 715/207 |

* cited by examiner

 Node uploaded a video

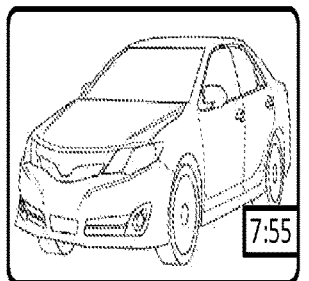

LAN Party: GTA IV Races

301 Views

Happy Friday NODE! Let's Race! You asked for it, so we're BRINGING it with EVEN MORE GTA IV!
Thank you for all your SUPPORT!!

—210

 FUNimation uploaded a video

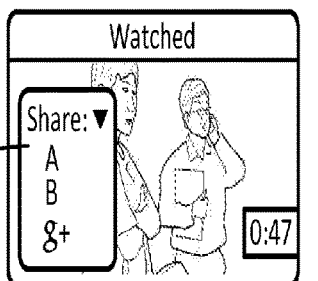

Karneval – FUNimation Spring Simulcast – OFFICAIL TRAILER 10,246 Views

Mondays at 1:35pm ET/ 12:35pm CT on http://funimation.com
Armed with only an abandoned bracelet as a clue. Nai searches for someone dear to him. After a run in with a pick-pocket named...

255

—220

 FUNimation uploaded a video

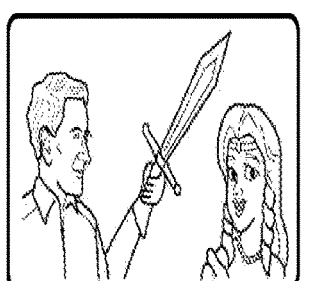

Soul Eater Clip – Fight Scene – Now on Cartoon Network – Trailer 7,489 Views http://www.funimation.com/s...
Soul Eater now available on Blu-ray, DVD, and TV! Check local.

MEDIA OBJECT ANNOTATION WITH INTERACTIVE ELEMENTS

RELATED APPLICATION

This application is a continuation application of U.S. patent application Ser. No. 14/264,885, filed on Apr. 29, 2014, the entire contents of which are hereby incorporated by reference herein.

BACKGROUND

An Internet-based video hosting service may provide videos through a Web page. Viewers may watch a desired video by selecting an icon, displayed on the Web page, which represents the desired video. After the video has played, the video hosting service may present the viewer with thumbnails of videos to watch next. Some video hosting services may provide the thumbnails in chronological order based on when the corresponding videos were uploaded to the video hosting service, or when in a series the videos occur.

A video hosting service may use a data format that provides viewers with regularly or frequently updated content. Such a data format may be referred to as a Web feed. The video hosting service may syndicate a Web feed, thereby allowing viewers to subscribe to the Web feed.

In a typical Web feed scenario, the video hosting service publishes a feed link on their Web site, and viewers then may register with the Web feed using, for example, aggregator programs executing on the viewers' media devices. The aggregator programs may be scheduled to periodically check for new content and to pull that content to the viewers' media devices.

The content delivered by a Web feed are typically HTML (Web page content) or links to Web pages and other kinds of digital media. Web sites that provide Web feeds to notify viewers of content updates may include only content summaries in the Web feed rather than the full content.

SUMMARY

A method for annotating media objects includes receiving a completion signal after display of a first media object on a media device; selecting for display on the media device, a second media object derived from the first media object; annotating the second media object with a completion sign; dynamically determining one or more interactive elements to display with display of the second media object; annotating the second media object with one of the one or more interactive elements; and providing the annotated second media object for display on the media device.

A system for annotating media objects includes a computer-readable storage medium having instructions for annotating media objects and providing the annotated media objects; and a processor that executes the instructions. In executing the instructions, the processor receives a completion signal after display of a first media object on a first media device, provides for display on the media device, a second media object derived from the first media object, annotates the second media object with a completion sign, dynamically determines one or more interactive elements to display with display of the second media object, annotates the second media object with one of the one or more interactive elements, and provides the annotated second media object to the first media device.

A computer-readable storage medium having media object annotation instructions that when executed by a processor, cause the processor to provide for display on a media device, a first media object and a second media object derived from the first media object; receive a completion signal after display of the first media object on the first media device, annotate the second media object with a completion sign; dynamically determine one or more interactive elements to display with display of the annotated second media object; further annotate the annotated second media object with one of the one or more interactive elements, and provide the further annotated second media object to the first media device to replace the second media object.

DESCRIPTION OF THE DRAWINGS

The detailed description refers to the following figures in which like numerals refer to like items, and in which;

FIG. 2C illustrates an example viewer interface implementing interactive elements rendered with media objects;

DETAILED DESCRIPTION

Figure 1:
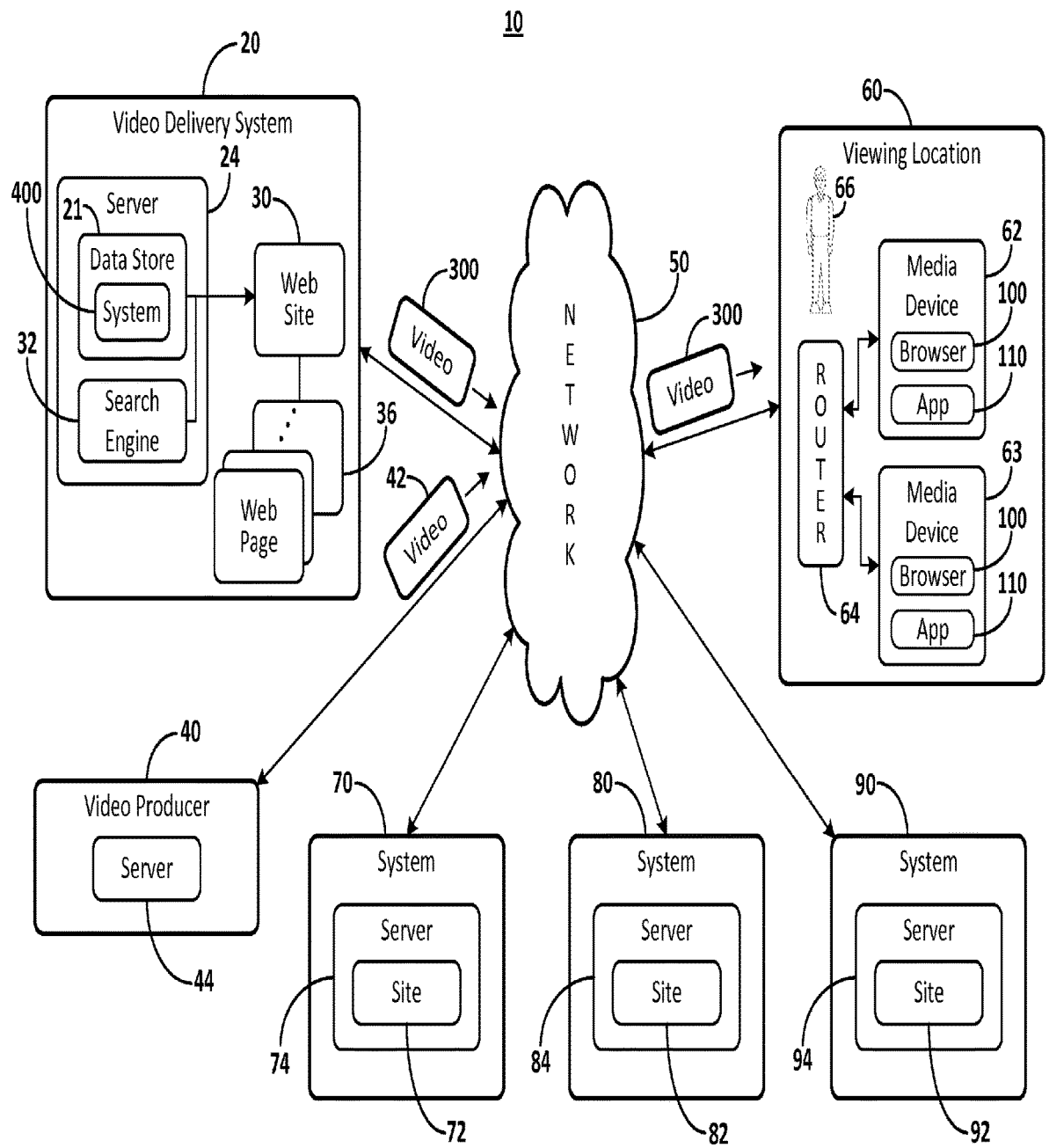
FIG. 1 illustrates an example of a video distribution environment.

Media objects include videos, still images, books, documents, music, and other resources, all of which may be accessed, downloaded, acquired, viewed and heard, as appropriate, from a media object delivery system. As an example, an Internet-based video hosting service may provide videos through a Web site and Web pages. Viewers may watch a desired video by selecting an icon, displayed on the Web page, which represents the desired video. The icon may be a thumbnail image derived, for example, from a frame of the video. The icon may be text, or may be a static image. After the video has played, the video hosting service may present the viewer with thumbnails of videos to watch next. Some video hosting services may provide the thumbnails of next-to-watch videos in chronological order based on when the corresponding videos were uploaded to the video hosting service, or when in a series the videos occur.

In both these cases, the Web page also may display thumbnails for videos which the viewer already has watched. In these cases, the already-watched video thumbnails waste valuable screen real estate because the viewer likely will select a thumbnail for a video the viewer has not watched already.

The Web page may provide a mechanism by which a viewer can share a video with other viewers. The sharing mechanism may allow a viewer to share the video after the viewer has watched the video. This concept, sometimes referred to as social sharing, may be useful for video Web sites and social networks alike, and social sharing may drive a significant portion of Web site visits. The video Web site may implement multiple sharing options which, broadly speaking, may be categorized into two groups. Offsite sharing options include posting to a social network. Onsite sharing options include curating the video in a playlist or liking the video, both of which will create items that may be syndicated or distributed to other viewers or video hosting service subscribers.

Offsite sharing may be more useful to a video subscription service than the onsite sharing because offsite sharing may generate many more referrals to the video Web site and consequently video viewing session starts than does onsite sharing. However, onsite sharing generally requires only a single click by the viewer, while offsite sharing may involve more complicated processes. For example, to share a video to another network, a viewer may encounter a variety of hurdles/clicks/processes, such as signing onto the other network. Thus, onsite sharing may be considered more of a "light weight" and viewer-friendly process than offsite sharing.

Viewers may not treat all videos the same way; some videos are more frequently shared, and some are more frequently curated. Similarly, viewers may not respond to all videos favorably. Viewers who do not like a video are not likely to share that video.

Disclosed herein are systems and methods for dynamically annotating video thumbnails in a viewer interface overlay with interactive elements based on viewer interactions with corresponding videos and with the video thumbnails. The herein disclosed systems and methods may increase the use of interactive features (e.g., social sharing features) anywhere video thumbnails appear. Use of these interactive features may lead to more traffic, more ad impressions, and more revenue for a video subscription service or other video provider. To limit clutter, in an embodiment, the systems and methods render interactive elements on video thumbnails only for videos that a viewer already has seen. As disclosed herein, the method may include a complex and resource-intensive process to look up the viewed/not-viewed status of videos, and to dynamically rearrange a viewer interface based on the viewed/not-viewed information.

In an aspect, annotations in the viewer interface are based on a number of possible scores that result from, or are indicative of, the viewer's interactions with the video and/or the video thumbnail. Examples of these scores include:

Liking score: (the viewer likes or dislikes the video and indicates such by selection a like/dislike button associated with the video).

Curation score: (the viewer adds a video to a playlist, a favorites list, or a watch later list).

Sharing score: (based on the number of shares for the video (i.e., the video itself may have a share annotation)).

Subscription score: (based on the frequency of unsubscribed viewers subscribing to the video channel after watching a video from that channel).

Other viewer interactions may be scored and used.

To collect these scores, the herein disclosed systems include mechanisms that extract data from logs that store information related to viewer interactions. Some of these logs may be stored locally, for example on a viewer's media devices, and subsequently may be transferred to a remote location; other logs may be stored remotely from the viewer's media devices. For each interaction or action extracted from the logs, the system may score the video. For example, a video that is frequently added to playlists or added to a favorites list may receive a high curation score, while a video that is shared frequently may receive a high sharing score.

The scores for videos are stored in a database and may be normalized when read from the database in at least two respects. First, a score such as a sharing score may be normalized across all viewers of the video who have shared the video. Second, a specific viewer's scores may be normalized. For example, a specific viewer may view 100 videos, and of the 100 may share 50 and like/dislike 30 for scores of 0.5 and 0.3, respectively. Other normalization schemes may be used. Normalizing on read ensures that the normalization score is current.

When the video delivery system renders a previously-watched video thumbnail, that thumbnail may be greyed out and marked as watched. In addition, the thumbnail may be annotated, using the herein disclosed system, to add interactive elements (e.g., social share buttons) over or adjacent to the greyed out thumbnail.

The system may dynamically annotate the greyed out thumbnail with interactive elements using the following example logic:

The system determines scores for a given thumbnail by combining the normalized scores for the video with the normalized scores for the specific viewer. Next, the system extracts the actions that the viewer has already taken (if any) with respect to the video. The system then eliminates scores associated with those actions that the viewer has already taken by setting the scores to zero. For example, if the viewer has already shared a video, the normalized combined sharing score is set to zero.

Likes and dislikes may merit special treatment. For example, if the viewer disliked the video, the system may provide a "remove from feed" option with an X if the video thumbnail is shown in a Web feed that the viewer can manipulate, such as the viewer's syndicated Web feed. If, however, the viewer has liked the video, the system may apply a modest score boost to the sharing score and the subscription score.

Once all scores are adjusted, the system selects the highest remaining score, if one exists. The system then renders interactive elements corresponding to the selected score as an overlay to the previously-watched video thumbnail. If the selected score is a like score, the system renders a like and dislike button. If the selected score is a curation score, the system may render a favorite button and an add to playlist drop-down. If the selected score is a sharing score, the system renders a list of sharing options (which may be region specific). Finally, if the selected scores is a subscription score, the system renders a subscribe button and channel icon+name.

The herein disclosed systems and methods may invoke a two-stage playback mechanism. With this mechanism, the video hosting service may contract with social networks so that the social networks display shared videos in a video player provided by the video hosting service. In this embodiment, a viewer shares a video thumbnail with contacts in the viewer's social network. The video thumbnail may be hosted in an iframe provided by the video hosting service and through which the video thumbnail is rendered. The iframe may include an embedded video player. When a contact clicks on the shared video thumbnail, the video hosting service's video player opens and automatically plays the corresponding video. The video hosting service then is able to capture the viewing by the social media contact. With these data, the video hosting service may render a viewer interface as an overlay to the video thumbnail as the thumbnail appears on the social network Web site. When the viewer interface includes interactive elements, such as sharing buttons, only sharing buttons appropriate for that specific social network may be shown. Thus, in this aspect, the herein disclosed system provides interactive elements in a viewer interface based on the Web site where the video thumbnail is rendered.

In another aspect, the choice of which sharing button to render as an interactive element may depend on the identity of the viewer or the viewer's media device. For example, if the viewer is registered only with social network A, and not with social networks B and C, a sharing button appropriate for social network A only may be rendered. However, for an unknown viewer, the rendered social network sharing buttons may be those appropriate for the region in which the media device is located.

Determining what type of interactive element (e.g., a social share button or a subscribe button) may be based on the scoring process disclosed herein and may be intended to present a viewer with an interactive element that is most likely to garner the viewer's attention and action. For example, a viewer who has demonstrated a propensity to curate music videos, when presented with a music video thumbnail, would see, overlaid on the thumbnail, interactive elements that allow the viewer to curate the music video.

FIG. 1 illustrates an example of a video distribution and sharing environment. In FIG. 1, environment 10 includes video delivery system 20, video producer 40, communications network 50, video viewing location 60, and social network systems 70, 80, and 90.

The video delivery system 20 operates Web site 30. The Web site 30 is hosted on Web server 24. The Web site 30 includes Web pages 36. The Web site 30 may include Internet search features such as search engine 32 that allow Web site visitors 66 to search for videos 300 and other content displayed by the Web server 24 on the Web pages 36. The Web pages 36 may display the videos 300, as well as video advertisements, static advertisements, and other information. The Web server 24 may provide links to enable navigation among the Web pages 36.

The Web pages 36 may display search results in response to a search query submitted by Web site visitor 66 using the search engine 32. For example, a Web page 36 may display several videos that satisfy a search query (see FIG. 2B). Each such video may be assigned a unique identification (ID).

The Web site 30 may display videos created and uploaded by Web site visitor 66, video producer 40, and other entities.

The Web server 24 may incorporate components of a video advertisement system (not shown) that serves, or facilitates service of, advertisements on the Web pages 36.

The Web server 24 may include data store 21 on which is hosted video annotation system 400. The system 400 may provide for context and time-sensitive, dynamic annotation of video thumbnails displayed on the Web pages 36. The video annotation system 400 is described below.

The video delivery system 20 may allow Web site visitors 66 to subscribe to a video service. In an aspect, the subscription may provide Web site visitors 66 with greater access to features of the video delivery system 20. When subscribing, a Web site visitor 66 may be asked to provide certain personal information, such as age and gender, for example. The Web site visitor 66 also may be able to link social networks, such as the social networks 72, 82, and 92 to which the Web site visitor 66 also is subscribed, to the video delivery system 20. In an aspect, described below, a subscriber (Web site visitor 66) to the video delivery system 20 may be able to share videos with other subscribers to the video delivery system 20 and to subscribers to the social networks 72, 82, and 92.

The video producer 40 provides content, in the form of videos 42, which may be displayed on the Web pages 36, and viewed and/or heard by the Web site visitor 66 using the media devices 62 and 63. For example, the video producer 40 may create and provide videos, such as polar bear videos, for display by other entities such as the video delivery system 20. The video producer 40 may be a company, a movie or television studio, or an individual.

The communications network 50 may be any network that allows the transmission of signals, media, messages, voice, and data among the entities shown in FIG. 1, including radio, linear broadcast (over-the-air, cable, and satellite) television, on-demand channels, over-the-top media, including streaming video, movies, video clips, and games, and text, email, and still images, and transmission of signals, media, messages, voice, and data from a media device to another media device, computer, or server. The network 50 includes the Internet, cellular systems, and other current and future mechanisms for transmission of these and other media. The network 50 may be both wired and wireless. The network 50 may be all or a portion of an enterprise or secured network. In an example, the network 50 may be a virtual private network (VPN) between the video delivery system 20 and a media device at the viewing location 60 across a wire line or a wireless link. While illustrated as a single or continuous network, the network 50 may be divided logically into various sub-nets or virtual networks, so long as at least a portion of the network 50 may facilitate communications among the entities of FIG. 1.

The viewing location 60 may be the residence of an individual, such as Web site visitor 66, who operates media devices 62 and 63 to access, through router 64, resources such as the Web site 30. The viewing location 60 may be a mobile location that changes with time as, for example, when the Web site visitor 66 changes location. The media devices 62 and 63 may be fixed or mobile. For example, media device 62 may be an Internet connected smart television (iTV)(e.g., a television incorporating a processor and a browser); a basic or smart television connected to a set top box (STB), or other Internet-enabled device; a Blu-ray™ player; a game box; a desk top computer; and a radio, for example. Media device 63 may be a tablet, a smartphone, or a lap top computer, for example. The media devices 62 and 63 may include browsers, such as browser 100. The browser 100 may be a software application for retrieving, presenting, and traversing resources such as at the Web site 30. A resource may be identified by a Uniform Resource Locator (URL) and may be a Web page, image, video, or other content or media object. The URL may allow the browser 100 to connect to the Web site 30. Hyperlinks present in resources enable the Web site visitor 66 to navigate the browser 100 to related resources. The Web site visitor 66 may operate the browser 100 to search for Web sites related to specific topics or to search for a specific Web site by URL. The media devices 62 and 63 also may include applications 110. The Web site visitor 66 may cause the media devices 62 or 63 to execute an application 110, such as a mobile banking application, to access online banking services. The application 110 may involve use of a browser or other means, including cellular means, to connect to the online banking services. Other applications may include game applications. The game applications may include provisions for serving video advertisements during the play of the game. Once connected to the Web site 30, the media devices 62 and 63 may allow viewing of content such as videos and static images generated by entities such as the video producer 40 and displayed on the Web pages 36 at the Web site 30. The videos and static images may include slots or spaces into which programs such as advertisements may be placed. When such a video or static image is to be viewed on the media devices 62 or 63, the browser 100 may send an advertisement (ad) request to an ad server (not shown) which may be answered with a video advertisement and/or a static advertisement.

The Web site visitor 66 may access the social network systems 70, 80, and 90 to use a social networking Web site.

In some situations, information related to the Web site visitor 66, including identities of the media devices 62 and 63, geographical locations of the media devices 62 and 63, and other data, may be collected by the video delivery system 20 and other entities shown in FIG. 1. Such data may be recorded in logs maintained at the viewing location 60, and the log data may subsequently be transferred to and stored at the video delivery system 20. For example, Web site visitor actions may be recorded on a meter (not shown) incorporated into the router 64.

Figure 3A:
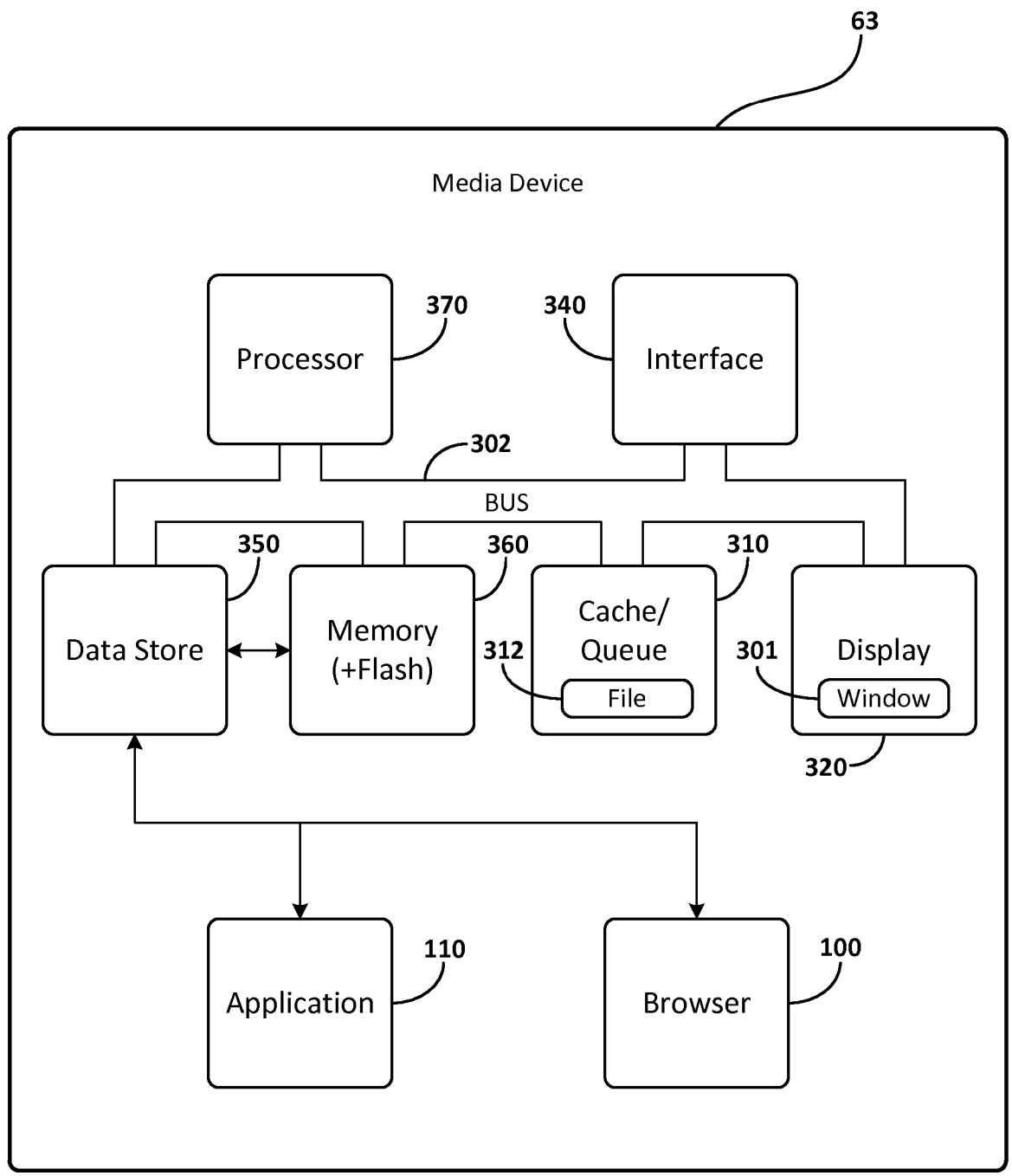
FIG. 3A illustrates an example media object annotation system implemented on a media device.

The media device 63 is described in more detail with respect to FIG. 3A.

Social network system 70 operates server 74 to provide social network 72. The social network 72 may allow subscribers, such as Web site visitor 66, to interact with other subscribers, may provide comments, upload videos, and upload images. Social network systems 80 and 90 may operate in a fashion similar to that of system 70.

The Web site visitor 66 may be a subscriber to one or all of the social networks 72, 82, and 92. To be a subscriber, the Web site visitor 66 may register with the social networks, and provide certain specific information, such as age and gender.

The Web site visitor 66 may use the social networks 72, 82, and 92 to communicate with designated friends or contacts. The Web site visitor 66 may use the social networks to make recommendations to these other subscribers. In an aspect, the Web site visitor 66 may make recommendations (i.e., share a video) with friends or contacts, or more generally, with other subscribers to the social networks.

Figure 2A:
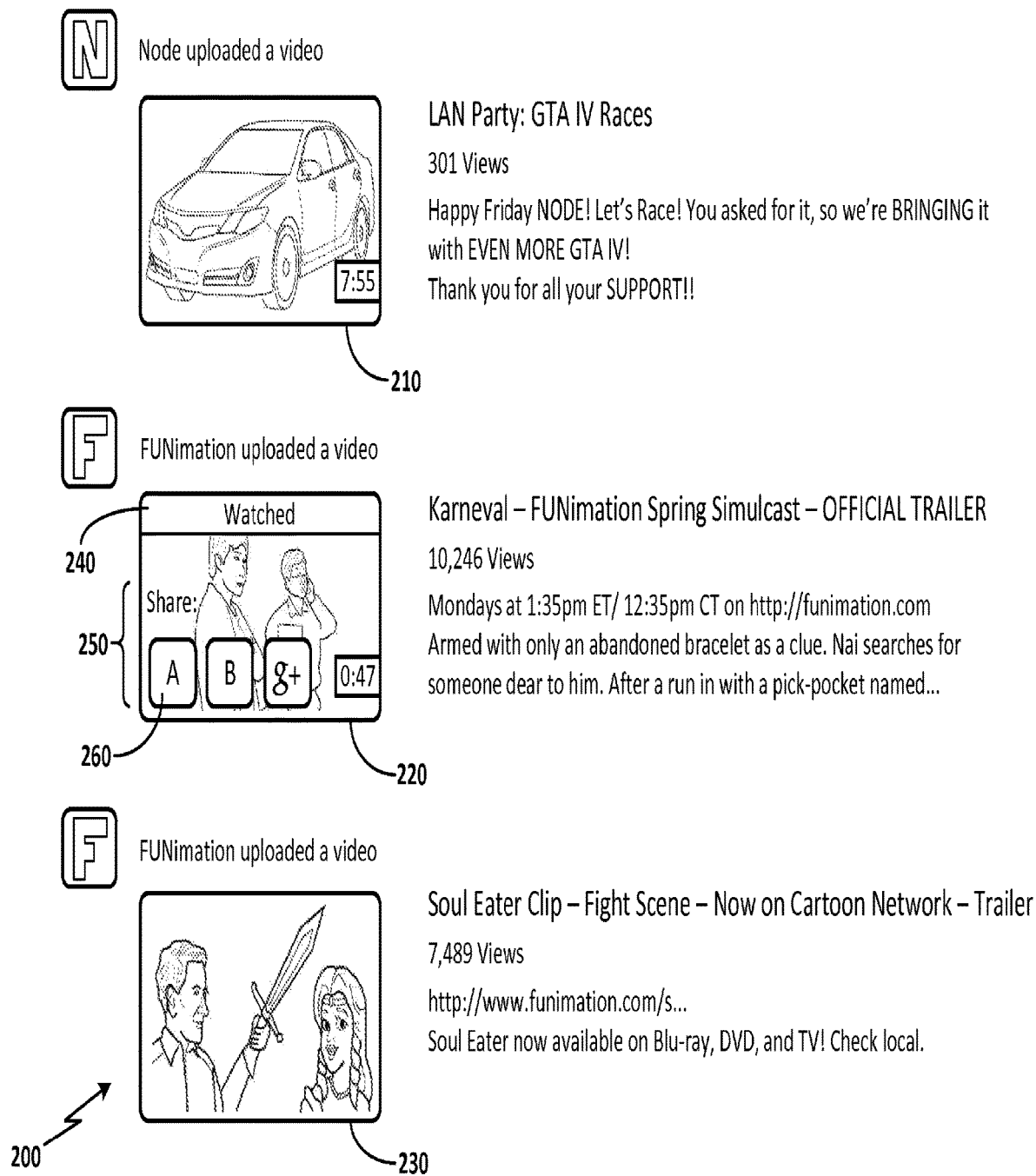
FIG. 2A illustrates an example viewer interface implementing interactive elements rendered with media objects.
Figure 2B:
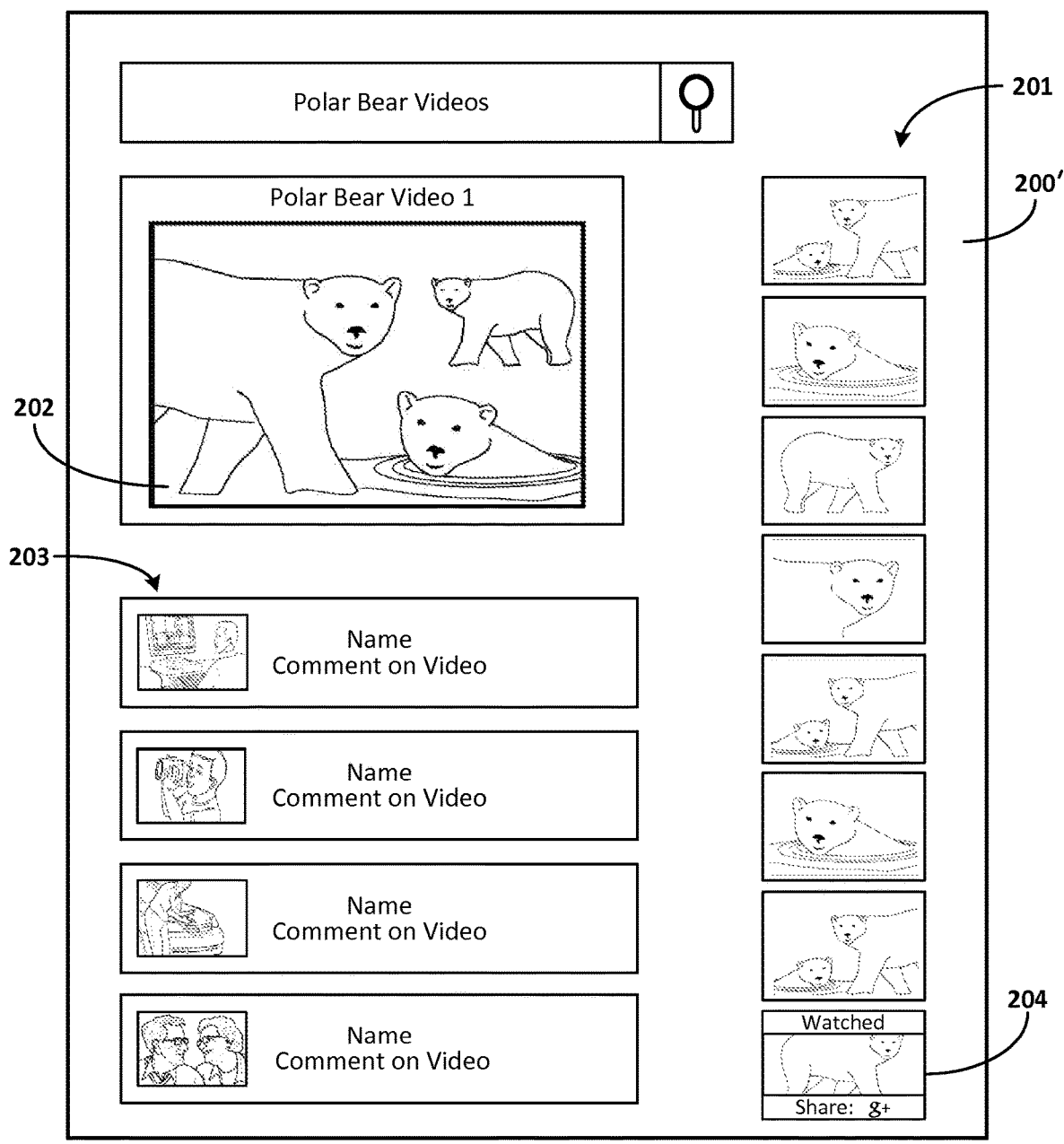
FIG. 2B illustrates an example viewer interface implementing interactive elements rendered with media objects.

FIGS. 2A-2C illustrate alternate embodiments of a Web page and a viewer interface that may be rendered with a video thumbnail to provide a Web site visitor 66 with certain interactive elements. FIG. 2A illustrates an example Web page implementing a user interface as an overlay on video thumbnails. In an aspect, a video thumbnail may be or may be derived from a frame of a video. The Web page may be, for example, a video watch page, a channel page, or any other Web page through which videos may be viewed. The video thumbnails may be arranged on the Web page in a variety of ways including based on when the video was uploaded, as determined by a channel owner, and as determined by the Web site visitor 66. However, if one of the thumbnails relates to an already-watched video, the thumbnail may be greyed out and annotated as "watched". Thus, In FIG. 2A, Web page 200 (a partial view of which is illustrated) includes video thumbnails 210, 220, and 230. Although three thumbnails are shown, the Web page 200 may include more thumbnails. In addition, the number of thumbnails displayed may differ depending on the media device on which the Web page 200 is rendered. For example, if the Web page is rendered on a smart phone, fewer thumbnails may be shown, because of the small screen size, than if the Web page 200 were rendered on a personal computer.

As can be seen in FIG. 2A, thumbnail 220 has been viewed already and is greyed out and marked as watched as indicated by text block 240. In addition, thumbnail 220 is annotated with interactive elements 260 that are provided in a viewer interface 250. In the specific example, of FIG. 2A, thumbnail 220 is annotated with sharing buttons A, B, and g+, and the word "Share.". However, other interactive elements 260 may be rendered in lieu of sharing buttons. If a Web site visitor 66 selects one of the sharing buttons, the video associated with the thumbnail 220 will be shared with the Web site visitor's contacts in the corresponding social network.

FIG. 2B shows Web page 200' in full size as may be seen on an example media device such as mobile media device 63. In FIG. 2B, the Web page 200' includes video player 202 in which a polar bear video is playing, comment section 203 in which visitor's 66 provide comments, and thumbnail section 201, in which video thumbnails are displayed. The video thumbnail may be arranged in any order as determined by the visitor 66, the video channel operator, or the video delivery system operator, for example.

As shown, video thumbnail 204 was previously viewed by the Web site visitor 66 viewing polar bear video 1, and thus is grayed out and marked with a completion sign such as "Watched." Also provided with the thumbnail 204 is a share annotation. The share annotation includes the word 'Share" and a sharing button (g+) selected by processes executed on the Web server 24.

FIG. 2C illustrates an alternate viewer interface 255, which is shown implemented as a drop-down menu overlaying the video thumbnail 220. The interface 255 may appear as an overlay when the visitor 66 hovers a pointing device over the thumbnail 220. The example drop-down menu of FIG. 2C shows three possible video sharing choices (the same choices as in FIG. 2A) from which the visitor 66 may choose one, more than one, or all choices.

In an embodiment, the video delivery system operator determines which videos may have interactive elements 260 rendered on corresponding video thumbnails, the types of interactive elements 260 (e.g., like/dislike buttons, sharing buttons), as well as specific characteristics of the annotations, appearance and location of the interactive elements 260, linked or connected resources (e.g., social network sites), and other characteristics. In another embodiment, the video provider or video uploader may specify which interactive elements to provide as overlays for previously-watched videos.

In an embodiment, whether or not an interactive element 260 is rendered on a thumbnail after a video has been viewed may depend in part on the media device on which the video player executes, the Web site visitor 66 who operates the media device, and circumstances in which the video is rendered. As an example, the Web site visitor 66 may not be registered with any social networks, a fact that may be determined by the video delivery system operator, or which may be determined locally at the media device. In this example, either at the video delivery system 20 or the media device, a processor may execute programming to indicate a share button is not to be rendered with the video thumbnail.

In an embodiment, the system 400 (see FIG. 4), described below, selects an interactive element 260 that is best suited for display with a video thumbnail based, for example, on criteria selected by the video delivery system operator. In an embodiment, the system 400 allows the video delivery system operator to specify a duration for display of the interactive element 260.

In an embodiment, the system 400 provides for a video thumbnail annotation that is a dynamic video sharing annotation. In an aspect, the video sharing annotation allows the video delivery system operator/video provider to specify which of several possible social networks (e.g., networks 72, 82, and 92) are to be linked to the video thumbnail having the interactive element 260. In an aspect, the video provider merely provides the dynamic video sharing annotation, and the system 400, using pre-determined rules, selects social networks to be linked through the interactive element 260. In an aspect, the video sharing annotation is dynamic in the sense that the specific social networks to be linked for sharing purposes are determined at the time of display of the associated video and/or video thumbnails. In an aspect, the selection of social networks for linking is based on the geographical location of the media device 63, or other indicators of geographical location. In an embodiment, the geographical location may be determined based on the IP address of the media device 63. In another embodiment, the geographical location may be determined based on actual geographical coordinates such as may be provided by a geo-locating service operating a geo-positioning satellite (GPS).

In another embodiment, the system 400 selects sharing annotations representing social networks based on the language of browser 100 in media device 63. For example, many browsers use English as a language, and the system 400 may use the detection of an English-language browser as an indication of which social networks to select.

FIG. 3A illustrates an example media device that may display video content in the environment 10 of FIG. 1. In FIG. 3A, media device 63 includes browser 100, application 110, cache/queue 310, display 320, interface 340, data store 350, memory 360, and processor 370. The processor 370, interface 340, data store 350, memory 360, cache 310, and display 320 are connected by communications and data bus 302. The browser 100 may be a software program for retrieving, presenting, and traversing resources such as at the Web site 30. The browser 100 may be stored in the data store 350 and loaded into memory 360 by the processor 370. Hyperlinks present in resources enable the visitor 66 to navigate the browser 100 to related resources. When operating browser 100, the visitor 66 may scroll up or down, left or right, in order to view the entire Web page 36. The browser 100 enables the visitor 66 to access, retrieve and view documents and other resources on the Internet. The browser 100 also may be used to access information provided by Web servers in private networks or files in file systems.

The browser 100 may include computer code to store a file 312 in cache/queue 310 and record visitor actions. The browser 100 may store information related to Web site visits, including the URL of the Web site, date and time of visit, length of visit (or start and stop time of visit), and actions taken by the visitor 66 during the visit.

In an example, when a visitor 66 visits the Web site 30 (or uses an application 110) the file 312 may store a random ID of the browser 100 and no other Web site data. In this example, the contents of the file 312 may be provided to the video delivery system 20 by way of the Web server 24. If the visitor 66 logs on to the Web site 30, the Web server 24 may use this log on to correlate the visitor 66 with the random ID, and may use this correlation when annotating thumbnails for previously-watched videos.

The display 320 includes programming and hardware aspects that provide a display screen or browser window 301 and the programming and hardware to display the content, data, and information stored in the cache 310.

The application 110 may be installed on the media device 63 to perform a specific function. For example, the application 110 may be a mobile banking application. The application 110 may be stored in the data store 350 and loaded into memory 360 and executed by the processor 370.

The interface 340 includes a data entry device such as a keyboard, a mouse, a speaker, and a voice command input such as a microphone. Operation of the interface 340 may provide the visitor 66 with audio and visual features. The interface 340 also includes programming aspects such as scrolling features that allow the visitor 66 to change a position of the displayed Web page 36 relative to the display 320 and the browser window 301.

The data store 350 is or includes a non-transitory computer-readable storage medium. The data store 350 may be embodied in many forms, such as a hard disk drive, a magnetic disk drive, an optical disk drive, a tape drive, or another type of computer readable media which can store data that are accessible by the processor 370. The data store 350 may store programming to operate the media device 63 and applications that execute on the media device 63. The data store 350 also may store components of a video annotation system, which is described in more detail with respect to FIG. 3B.

The memory 360 stores the above-mentioned programming and other programming such as an operating system (not shown) for execution by the processor 370 to operate the media device 63.

When visiting the Web site 30, the visitor 66 may register with and log on to the Web site 30 by providing a visitor-created identification (i.e., a visitor ID) and a password and/or pass code, for example. Alternately, the visitor 66 may access the Web site 30 without registering and without logging on. Whether or not logged on, the visitor 66 may take actions that may be recorded as visitor actions at the Web site 30 such as clicking on a link, filling a shopping cart, down loading content, uploading content, purchasing a product or service, or filling out a form, in addition to sharing, subscribing, crating, liking and disliking a video, for example.

When using an application 110, the visitor 66 may make various selections that also may be recorded and analyzed at the Web server 24. For example, the visitor 66 may select a video advertisement presented during execution of the application 110. The selection may be recorded as an impression.

Similar to the browser 100, the application 110 may store in file 312 visitor identification information, Internet address information, and other data and information related to use of the application 110.

The methods executed by the herein disclosed devices such as the media device 63 of FIG. 3A and systems such as those illustrated in FIGS. 3B and 4 (described below) may involve use of information that in some respect identifies a media device the visitor 66 uses to access the Internet-based content. For example, when a visitor 66 uses the browser 100 to access a Web site, the Web server 24 may create a random identification (ID) that identifies the browser 100 and may cause the random ID to be stored on the visitor's media device 63.

In situations in which the systems disclosed herein collect personal information about visitors 66, or may make use of personal information, the visitors 66 may be provided with an opportunity to control whether programs or features collect visitor information (e.g., information about a visitor's social network, social actions or activities, profession, a visitor's preferences, or a visitor's current location), or to control whether and/or how to receive content from a server that may be more relevant or of interest to the visitor 66. In addition, certain data may be treated in one or more ways before it is stored or used, so that personally identifiable information is removed. For example, a visitor's identity may be treated so that no personally identifiable information can be determined for the visitor 66, or a visitor's geographic location may be generalized where location information is obtained (such as to a city, ZIP code, or state level), so that a particular location of a visitor 66 cannot be determined. Thus, the visitor 66 may control how information is collected about the visitor 66 and used by a server.

Figure 3B:
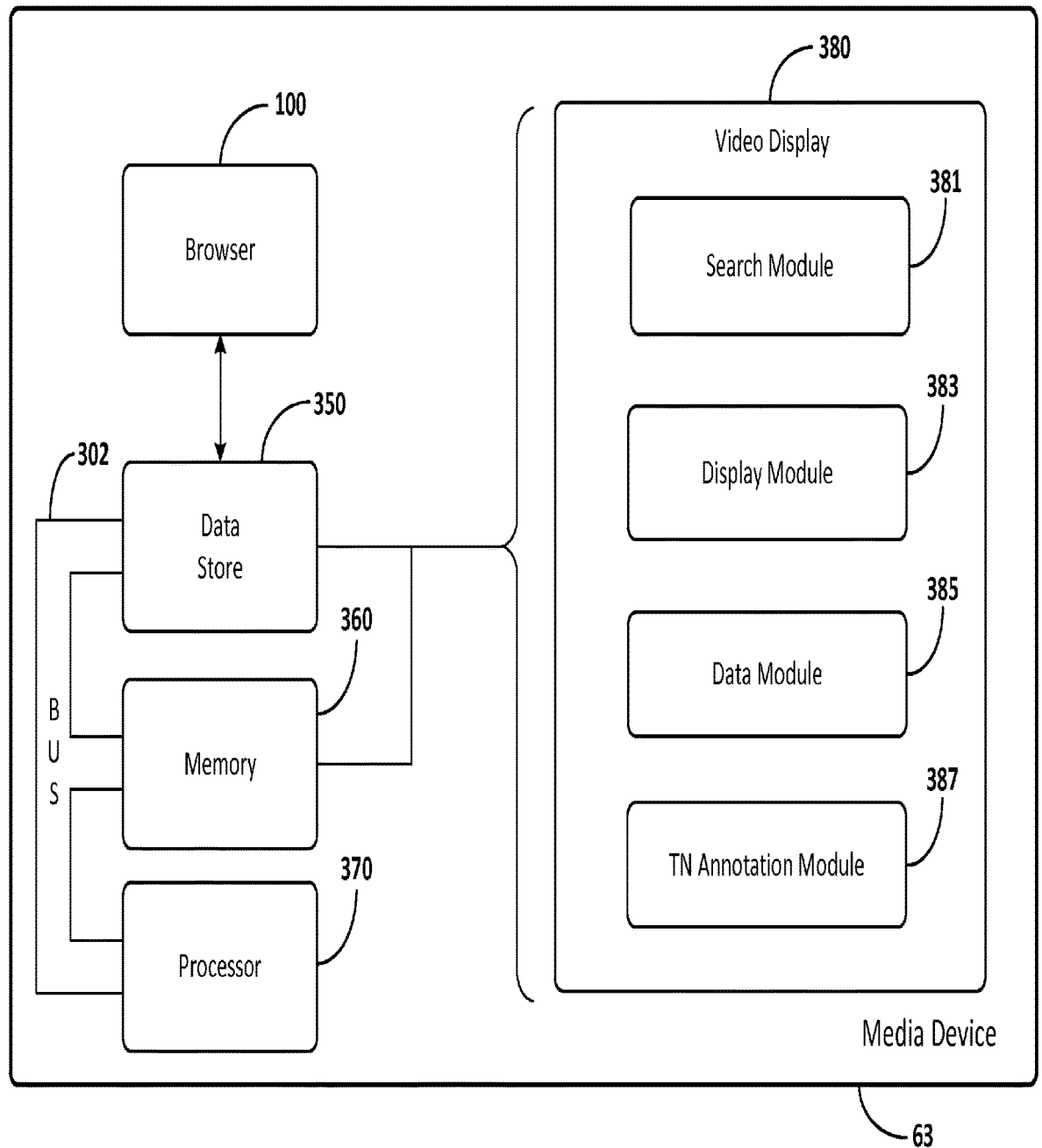
FIG. 3B illustrates an example media object annotation system implemented on a media device.

FIG. 3B illustrates example components installed on media device 63 that facilitate search for, reception, and display of requested and suggested videos, and annotation of previously-watched video thumbnails. In FIG. 3B, data store 350 of media device 63 stores video display system 380, which the processor 370 loads into memory 360 and executes. The system 380 includes search module 381, display module 383, data module 385, and video thumbnail annotation module 387.

The search module 381 provides or facilitates search related functions that allow the visitor 66 to search resources such as video sharing Web sites, streaming video Web sites, and other online resources to locate, download, and display media objects, such as videos, related to specific topics or categories by entering, for example, a search term. The search module 381 may be persisted in the data store 350, or may be downloaded with each access to a resource.

With respect to videos, the display module 383 provides video playback and other control functions, and a media display window that allows the visitor 66 to view videos and similar media, including requested/suggested videos and promoted videos. The module 383 may include a video player, which may be downloaded when the visitor 66 accesses an online resource, and which may be persisted in the data store 350. Alternately, the video player may be a component of the browser 100.

With respect to videos, the data module 385 records data related to the playing of requested/suggested videos and promoted videos and may provide some or all of this data to an entity external to the viewing location 60; for example, the data may be provided to the video delivery system 20.

Figure 4:
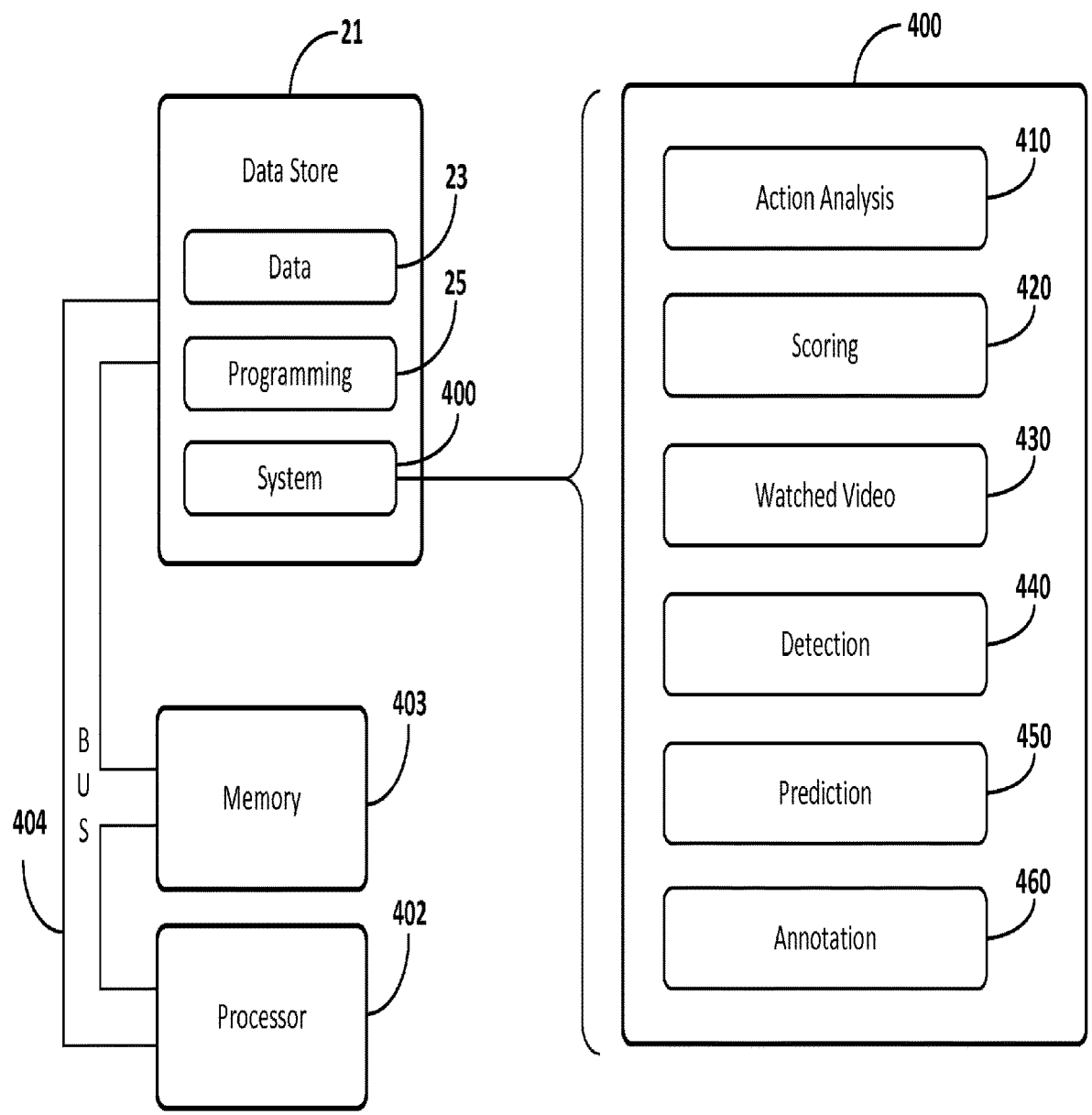
FIG. 4 illustrates a remote-server-based system that implements media object annotation.

The video thumbnail annotation module 387 provides as overlays and/or pull-down menus, a previously-watched sign (i.e., completion sign) and an interactive element selected by a remote server (see FIG. 4).

FIG. 4 illustrates a remote-server-based system that implements video thumbnail annotation with interactive elements such as those shown in FIGS. 2A-2C. In FIG. 4, system 400 may be stored in data store 21, which is or may include a non-transitory computer readable storage medium. The system 400 is accessed by processor 402, loaded into memory 403 over bus 404, and executed by the processor 402.

The system 400 includes action analysis engine 410, scoring engine 420, watched video engine 430, detection engine 440, prediction engine 450, and annotation engine 460. Action analysis engine 410 detects and analyzes certain actions of a visitor 66 in response to displaying a video on Web page 200 (see FIG. 2A). For example, the action analysis engine 410 may determine if and when the visitor 66 watches a video to conclusion, mutes audio associated with the video, or scrolls such that the video player is not displayed on the media device display screen. The engine 410 also receives information that may be used to generate scores related to the video. For example, the engine 410 may detect when the visitor 66 likes or dislikes the video and indicates such by selection of a like/dislike button associated with the video; adds a video to a playlist, a favorites list, or a watch later list; shares the video (i.e., the video itself may have a share annotation); and subscribes to the video's channel. Other visitor actions may be detected and used.

In an aspect, the engine 410 detects these visitor actions after receiving log data from the visitor's media device. In this aspect, all visitor actions may be stored in database 23 at Web server 24. Periodically, the engine 410 may retrieve data related to visitor actions and to visitors 66. The retrieved data may be used in other components of the system 400 to generate and update various scores associated with videos and scores associated with visitors 66. In another aspect, the visitor interactions are recorded in real time or near real time in the database 23 at the Web server 24.

Scoring engine 420 computes and normalizes scores for visitors 66 and videos. An example scoring process may count a number of times a video is shared, liked, curated, or subscribed, with each action assigned the count as a raw score. The scoring process may count the number of times a visitor 66 shares, likes, curates, or subscribes to a video, with each action assigned the count as a raw score. The engine 420 may store scores for videos and visitors 66 in the database 23. The engine 420 then may normalize the scores for a visitor 66 or a video when the data are read from the database 23. Normalizing on read may ensure that the normalization score is current. The engine 420 then provides the normalized scores to other components of the system 400. For a video, the normalized score may indicate the probability that a specific action (share, curate) will be taken by any visitor 66 with respect to that video. For a visitor 66, the normalized score may indicate the probability the visitor 66 will take a specific action (share, curate) with respect to any watched video. The scoring process may be refined further considering visitor demographic data and content-related data and metadata related to videos. For example, younger visitors may be more likely to share a music video and older visitors may be more likely to curate the music video.

Watched video engine 430 records identities of videos a visitor 66 has watched and the number of times the visitor 66 has watched a specific video. The engine 430 may store this data in the database 23 for a limited time. For example, the engine 430 may discard video watched data for videos viewed more than six months earlier than the current date.

Detection engine 440 detects various aspects of operation of media devices. For example, the engine 440 may detect an identification of the media device 63 when connected to the Web site 30. The engine 440 may be used to determine a language of the browser 100 of the media device 63. The engine 440 may detect a location of the media device 63 (e.g., by noting the IP address associated with the media device 63). In the absence of other information, as a default selection, the system 400 may use the location of the media device 63 to determine which interactive elements (e.g., which social network) to display. The engine 440 may detect which social networks to which the media device 63 is logged on or subscribed.

Prediction engine 450 provides logic for determining which interactive elements 260 to overlay on a thumbnail of a previously-viewed video. The logic may include machine learning algorithms. In an aspect, the engine 450 generates a thumbnail score by combining the each of the normalized video scores for the associated video and the normalized visitor scores for the visitor 66 who may view the thumbnail. In an aspect, the thumbnail score is a normalized thumbnail score. However, if the visitor 66 has already taken a specific action (share, curate), the engine 450 may set the score for that action to zero so that the associated interactive element 260 will not be displayed on the thumbnail.

If the visitor 66 disliked the associated video, the engine 450 may show a "remove from feed option" (e.g., an X over the thumbnail) if the thumbnail is shown in a feed the visitor 66 can manipulate (e.g., the visitor's syndicated feed).

If the visitor 66 liked the associated video, the engine 450 may apply a boost to the sharing score and the subscription score.

The engine 450 then may select the highest remaining thumbnail score, if one exists, and send the selection to the annotation engine 460.

In an aspect, execution of the engine 450 may lead, gradually, to the best performing interactive element being chosen for display based on a specific video/visitor scoring combination. For example, a well-performing interactive element should be selected more often that a poor-performing interactive element. This condition will, over time, cause an increase in scores for the more highly-selected interactive element. As a result, execution of the engine 450 may start with a randomly-chosen interactive element, and over time, the best-performing interactive element should be chosen consistently by the engine 450. That is, over time, the engine 450 will provide exactly the interactive element the visitor 66 is most likely to select. On a subsequent display of the same "watched" thumbnail, the engine 450 would select the next most likely interactive element, and so on.

Annotation engine 460 annotates thumbnails of watched videos with a completion sign such as a previously-watched sign. The previously-watched sign may include the text "watched" overlaid on the thumbnail and the thumbnail may be grayed out as shown in FIG. 2A. The annotation engine 460 further annotates the thumbnail with one or more interactive elements as indicated by the selection of the engine 450. For example: if the like score is highest, the engine 460 provides a like/dislike button; if the curation score is highest, the engine 460 provides a favorite button and an add to playlist drop-down menu; if the sharing score is highest, the engine 460 provides sharing button(s); if the subscription score is highest, the engine 460 provides a subscribe button and optionally a channel name and icon. When providing sharing button(s), the engine 460 may select social networks based on their overall popularity, the prevalence of their use in the geographical location/region of the visitor's media device, or based on known registrations of the visitor 66 with social networks.

In an aspect, the thumbnails are rendered though an iframe provided by the video delivery system 20 (generally, an iframe is an HTML tag that allows a Web page to be displayed in a frame within another Web page). Then, when the video or thumbnail is rendered on another Web site, such as a social network Web site, the Web server 24 is able to capture the visitor's "clicks," determine the visitor's video watched history, and decorate video thumbnails with the video previously-watched sign as well as interactive elements appropriate to the Web site—in the case of a social network Web site, the interactive element may be a sharing button appropriate for the social network. Thus, the interactive elements provided by the annotation engine 460 are determined dynamically depending on the Web site at which the thumbnail is rendered.

In an embodiment, the system 400 may execute to display interactive elements for a limited time during display of the video thumbnail. For example, if the engine 450 selects a sharing button as the best-performing interactive element and a subscription button as the second best-performing element, the annotation engine 460 may provide the sharing button for the first 15 seconds of display of the thumbnail and the subscription button thereafter. This aspect of operation of the system 400 may take advantage of the fact that shifting pixels in a display tends to attract the attention of a visitor 66, and thus the visitor 66 may be more likely to click on the interactive element.

In an embodiment, the interactive elements may be displayed as an overlay to a previously-watched video thumbnail. In an aspect of this embodiment, the interactive elements are provided on a top level of the thumbnail such that the interactive elements may be seen immediately when the thumbnail is displayed. In another aspect of this embodiment, the interactive elements are provided in a lower level of the thumbnail, and a visitor 66 may hover a pointing device such as a cursor over the previously-watched video thumbnail in order to cause display of the interactive elements. In another embodiment, the interactive elements may be provided in a drop-down menu overlaid on the previously-watched video thumbnail. In an aspect of either of these two embodiments, the interactive elements may or may not include a text indication of the interactive element's functions. For example, the interactive element for a sharing function may not include the word "share."

The above description refers generally to annotation of thumbnails for previously-watched videos. However, similar concepts may be employed for other media objects. For example, an online application store may present millions of downloadable applications arranged according to type, genre, popularity, newness, or other criteria. A Web site visitor 66 who already has downloaded a specific version of an application may see a thumbnail for that application grayed out with the text "downloaded" and appropriate interactive elements (share, like/dislike) as an overlay to the thumbnail. This concept may be extended to an online music store, an online bookstore (selling electronic books and/or hard-copy books), or any other online retailer. Thus, the concepts may be used to decorate a first media object (e.g., a video thumbnail), which represents a second media object (e.g., the corresponding video), with a previously-watched/acquired sign (i.e., a completion sign), as appropriate, and one or more interactive elements appropriate for the second media object.

Figure 5:
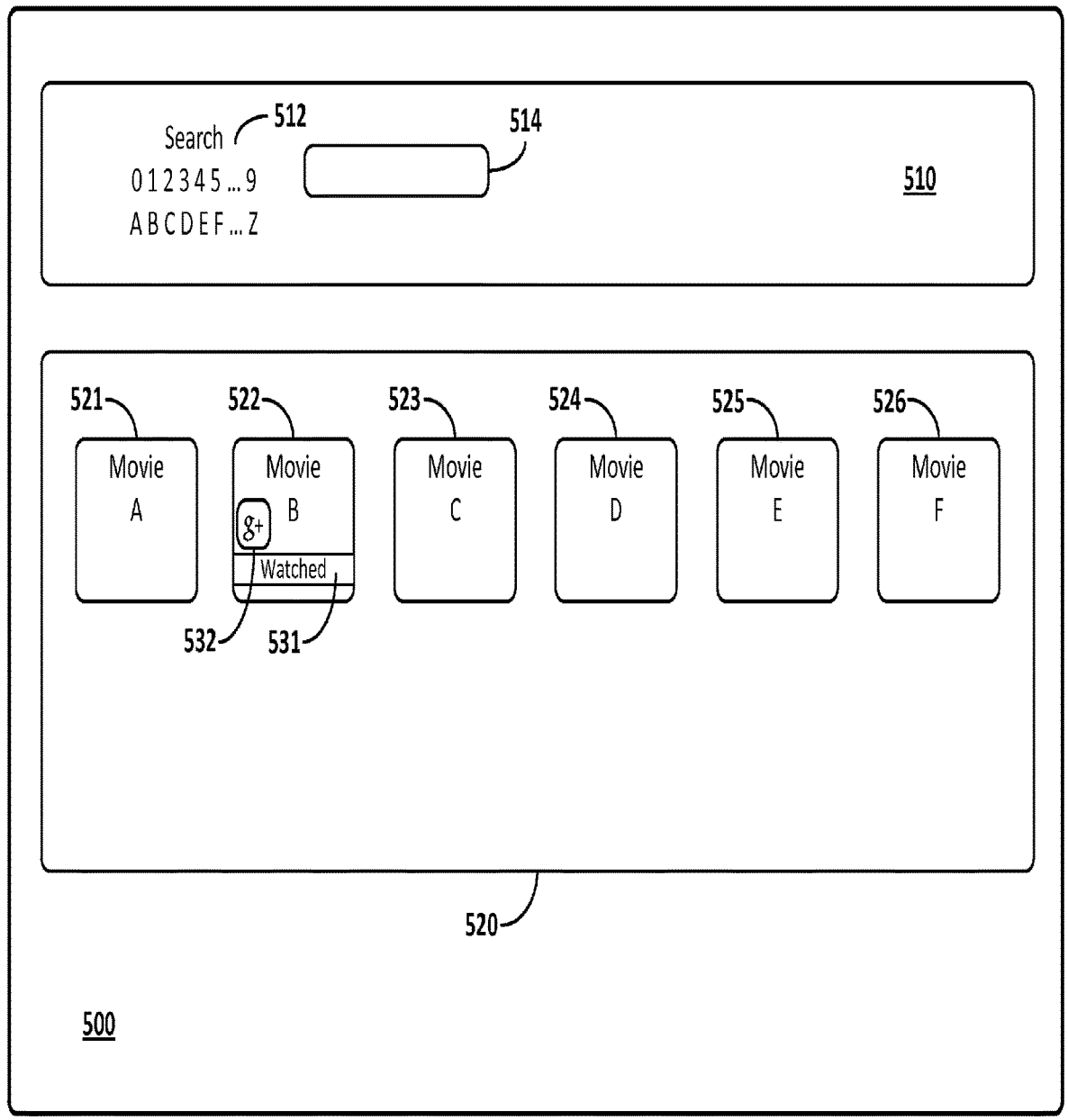
FIG. 5 illustrates a viewer interface implementing annotated thumbnails representing previously viewed/acquired media objects.

FIG. 5 illustrates an example viewer interface for media objects. In FIG. 5, viewer interface 500 is shown displayed on media device 62 (see FIG. 1), which is an iTV (a fixed media device). The iTV 62 may be controlled by remote control device 505. The viewer interface 500 may be provided by the video delivery system 20 or another provider offering a streaming television/movie subscription service, for example. The viewer interface 500 allows visitors 66 to search for, select, and order for display, various television programs, movies, videos, games, and other media objects or content.

The viewer interface 500 displays a search mechanism 510 which include an alpha-numeric array 512 and a search window 514. The search mechanism 510 may not always be displayed. The interface 500 also displays a video thumbnail section 520 in which thumbnails 521-526 are displayed. In the illustrated example, each thumbnail 521-526 represents a movie A-F that may be downloaded from the subscription service. As can be seen, Movie B (thumbnail 522) has been marked (531) as previously-watched by the visitor 66. Thumbnail 522 further may be grayed out. Finally, thumbnail 522 may be decorated with an appropriate interactive element; in the illustrated example, thumbnail 522 is decorated with a share button 532 appropriate for a social network to which the visitor 66 is subscribed.

In an aspect, the viewer interface 500 may display thumbnails for recently-viewed media objects (e.g., movies) is a section (not shown) apart from media objects that have not been viewed (or not viewed within a specified time such as the last three months). The thumbnails in the recently-viewed section may display an interactive element appropriate for the corresponding media object. In a further aspect, the interactive element is displayed when the thumbnail is centered in the recently-viewed section. In an alternate further aspect, the interactive element is displayed when the visitor 66 places a cursor or other pointing object over the thumbnail.

Figure 6:
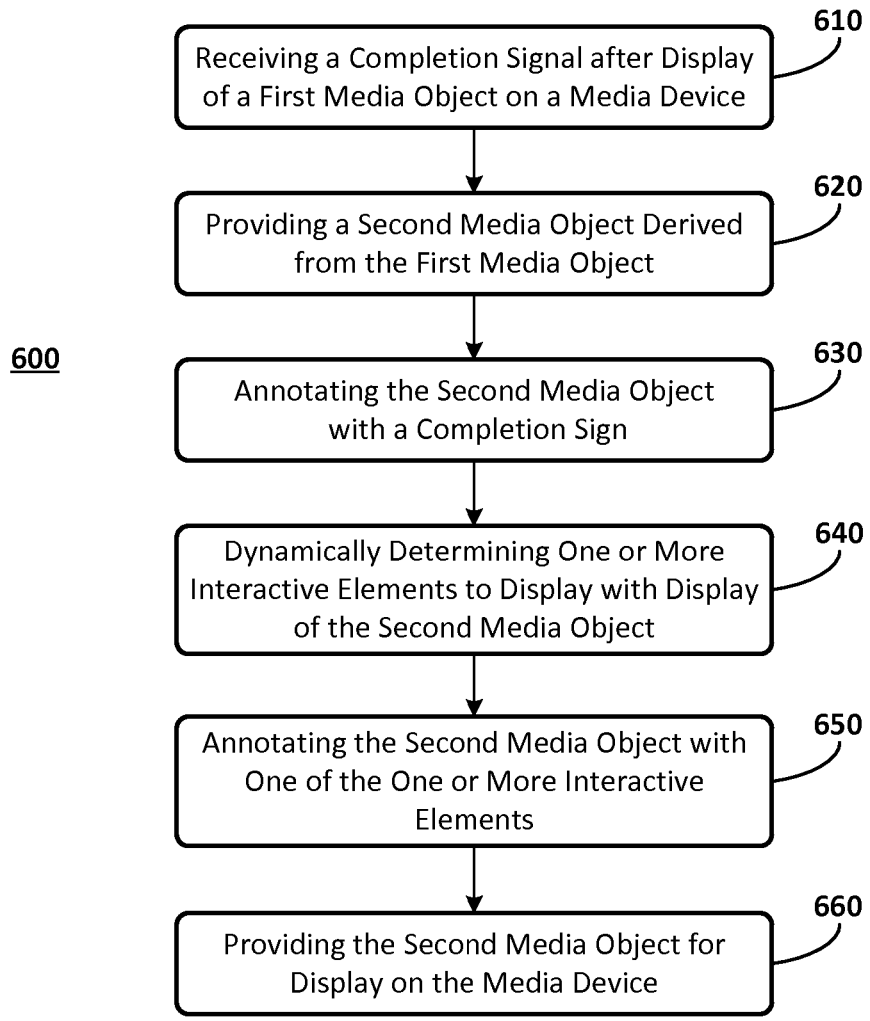
FIG. 6 illustrates an example media object annotation method.

FIG. 6 illustrates an example method for annotating a thumbnail for a previously-watched video with interactive elements. In the example of FIG. 6, method 600 results from execution, by processor 402 on Web server 24, of system 400. See FIGS. 1, 2A-2C, and 4.

In FIG. 6, method 600 begins in block 610: receiving a completion signal after display of a first media object on a media device. The first media object may be a video accessed from Web server 24 and displayed on video watch Web page 200 at mobile media device 63. The completion signal may be provided from displaying media device 63 after the video has played to completion or a specified amount of the video has been displayed. The completion signal indicates to the Web server 24 that the video is "previously-watched."

Block 620: selecting for display on the media device, a second media object derived from the first media object. The second media object may be a thumbnail image of the video. The thumbnail may be derived from the video; for example, the thumbnail may be a frame of the video. The thumbnail may be displayed on the same (refreshed) video watch page as the video.

Block 630: annotating the second media object with a completion sign. The completion sign may include the word "watched" displayed as an overlay on the second media object. The overlay may be a top layer overlay. In addition, the thumbnail may be grayed out.

Block 640: dynamically determining one or more interactive elements to display with display of the second media object. Based on historical visitor actions with respect to the displayed video and specific actions of the visitor 66 operating the media device 63, an annotation system may determine one or more interactive elements as possible overlays to provide with the thumbnail of the previously-watched video. The determination is dynamic in several aspects, including taking into account prior actions the visitor 66 may have taken with respect to either the video itself or the video thumbnail, whether the visitor 66 is subscribed to or signed on to a social network, the visitor's location, the media device used by the visitor 66, and other factors. For example, the visitor 66 may already have liked the video, using a like button provided with the video. In this example, the like/dislike option may not be provided with the possible interactive elements (like/dislike score set to zero). Alternately, the visitor 66 may already have selected like from an interactive element provided with the thumbnail. The next provision of the thumbnail may not include like/dislike as an option, and only scores for subscribe, curate, and share may be considered. See FIG. 7.

Block 650: annotating the second media object with one of the one or more interactive elements. The thus-annotated second media object will display a completion signal and an interactive element.

Block 660: providing the second media object for display on the media device.

Figure 7:
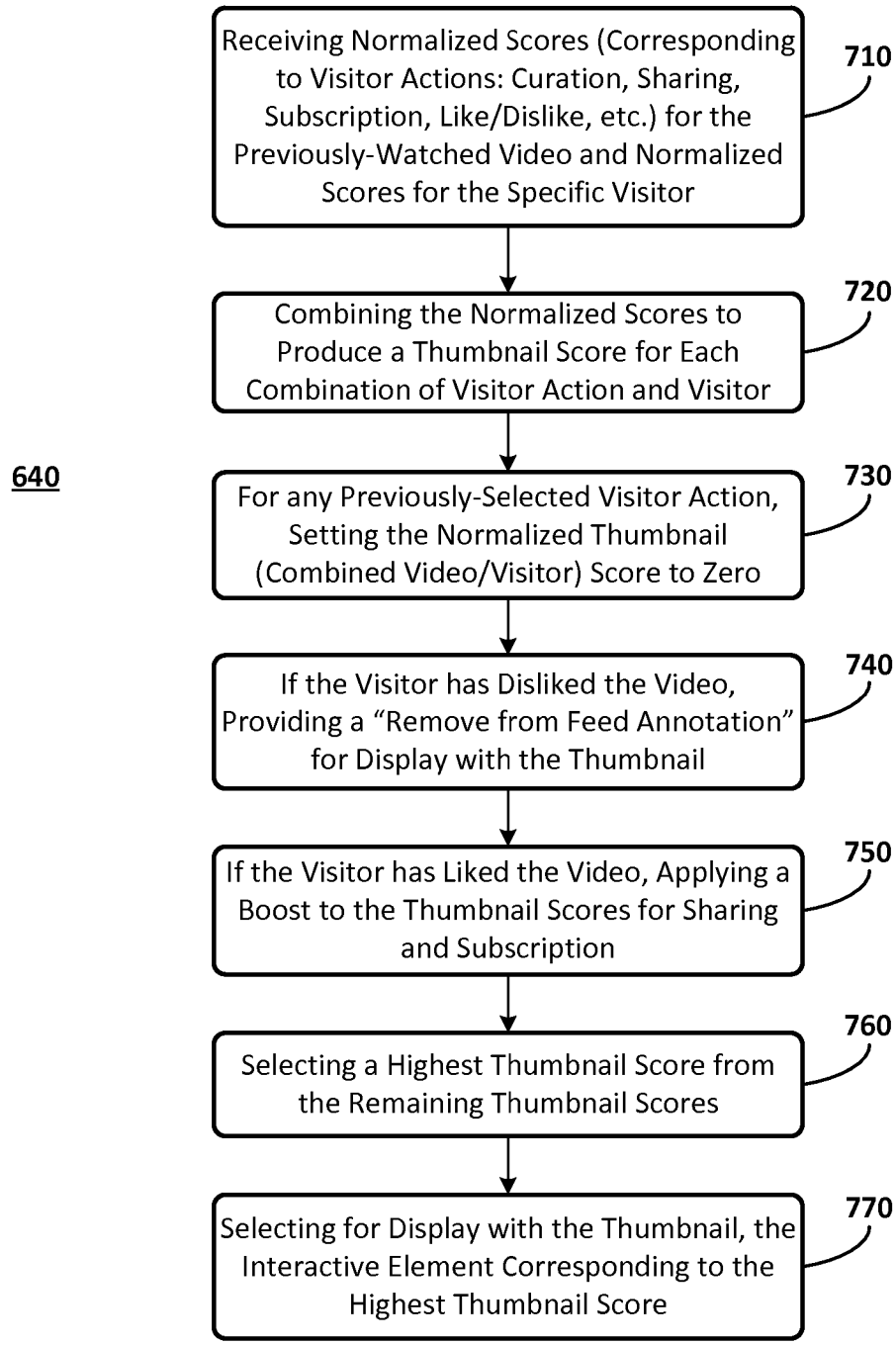
FIG. 7 illustrates an example media object annotation method.

FIG. 7 illustrates an example of the process of block 640 as processor 402 executes prediction engine 450 and other components of system 400. In FIG. 7, process 640 includes:

Block 710: receiving normalized scores (corresponding to visitor actions: curation, sharing, subscription, like/dislike, etc.) for the previously-watched video and normalized scores for the specific visitor 66. These data may be historical values stored in data store 21.

In an alternate embodiment, the system 400 may use normalized scores for a class of visitors 66. For example, the system 400 may compute an average score for all males, 18-24, and use this score in lieu of a score for a specific visitor 66 (and one aspect of the alternate embodiment is to use a visitor class to which the specific visitor 66 belongs—when known).

Block 720: combining the normalized scores to produce a thumbnail score for each combination of visitor action and visitor. For example, a visitor 66 may curate 50 percent of all music videos and 50 percent of a specific music video may always be curated. Thus, in an aspect, a normalized thumbnail score for the combined visitor action/visitor would be 50 percent ((50+50)/2). Other combining and normalizing schemes are possible.

Block 730: for any previously-selected visitor action, setting the normalized thumbnail (combined video/visitor) score to zero. This step eliminates the possibility that an interactive element corresponding to the zeroed thumbnail score is selected as an overlay to the thumbnail. Note that the visitor action may be taken with respect to the video itself (i.e., for example, the visitor 66 may select a "like" button on the video) or on the thumbnail (the visitor 66 selects a like button provided as an overlay on the thumbnail during a previous display of the thumbnail).

Block 740: if the visitor 66 has disliked the video, provide a "remove from feed annotation" for display with the thumbnail. The process of block 640 then ends.

Block 750: if the visitor 66 has liked the video, apply a boost to the thumbnail scores for sharing and subscription.

Block 760: select a highest thumbnail score from the remaining thumbnail scores.

Block 770: select for display with the thumbnail, the interactive element corresponding to the highest thumbnail score.

Certain of the devices shown in FIGS. 1 and 3A-4 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a flowcharts of FIGS. 6 and 7 and accompanying descriptions to illustrate the embodiments. The disclosed devices, components, and systems contemplate using or implementing any suitable technique for performing the steps illustrated. Thus, FIGS. 6 and 7 are for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A method comprising:
   determining, based on at least one score, whether a content item viewed by a user was approved by the user;
   responsive to determining that the content item has been approved by the user, selecting a share interactive element to display with a graphical representation of the content item to allow the content item to be shared with one or more other users in any of a plurality of content networks;
   annotating the graphical representation of the content item with the share interactive element; and
   providing, by a processor, the graphical representation of the content item with the share interactive element for display on a media device.

2. The method of claim 1, further comprising:
   receiving a user selection of the share interactive element; and
   providing the content item associated with the share interactive element to the one or more users in the plurality of content networks.

3. The method of claim 1, wherein the graphical representation is a thumbnail of the content item.

4. The method of claim 1, wherein the content item is a photo image.

5. The method of claim 1, wherein determining whether the content item viewed by the user has been approved by the user comprises:
   generating one or more scores indicative of a user's interaction with the content item.

6. The method of claim 5, wherein selecting the share interactive element to display with the graphical representation of the content item to allow the content item to be shared with the one or more other users in any of the plurality of content networks comprises:
   selecting a highest score from the one or more scores indicative of the user's interaction with the content item; and
   determining the highest score is associated with the share interactive element.

7. The method of claim 6, wherein the one or more scores are associated with a different one of a plurality of interactive elements.

8. The method of claim 5, wherein the one or more scores are generated using a machine learning algorithm.

9. The method of claim 1, wherein annotating the graphical representation of the content item with the share interactive element comprises:
   providing the interactive element as an overlay to the graphical representation to the content item.

10. The method of claim 1, wherein the interactive element is provided for display in a drop down menu.

11. A system comprising:
    a memory; and
    a processor, coupled to the memory, to:
    determine, based on at least one score, whether a content item viewed by a user was approved by the user;
    responsive to determining that the content item has been approved by the user, select a share interactive element to display with a graphical representation of the content item to allow the content item to be shared with one or more other users in any of a plurality of content networks;

annotate the graphical representation of the content item with the share interactive element; and provide the graphical representation of the content item with the share interactive element for display on a media device.

12. The system of claim 11, the processor further to:
receive a user selection of the share interactive element; and provide the content item associated with the share interactive element to the one or more users in the plurality of content networks.

13. The system of claim 11, wherein the content item is a photo image.

14. The system of claim 11, wherein to determine whether the content item viewed by the user has been approved by the user, the processor further to:
generate one or more scores indicative of a user's interaction with the content item.

15. The system of claim 14, wherein to select the share interactive element to display with the graphical representation of the content item to allow the content item to be shared with the one or more other users in any of the plurality of content networks the processor further to:
select a highest score from the one or more scores indicative of the user's interaction with the content item; and
determine the highest score is associated with the share interactive element.

16. The system of claim 14, wherein the one or more scores are generated using a machine learning algorithm.

17. A non-transitory computer-readable storage medium having instructions that, responsive to being executed by a processor, cause the processor to:

determine, based on at least one score, whether a content item viewed by a user was approved by the user;

responsive to determining that the content item has been approved by the user, select a share interactive element to display with a graphical representation of the content item to allow the content item to be shared with one or more other users in any of a plurality of content networks;

annotate the graphical representation of the content item with the share interactive element; and provide, by the processor, the graphical representation of the content item with the share interactive element for display on a media device.

18. The non-transitory computer-readable storage medium of claim 17, wherein to determine whether the content item viewed by the user has been approved by the user, the processor further to:
generate one or more scores indicative of a user's interaction with the content item.

19. The non-transitory computer-readable storage medium of claim 18, wherein to select the share interactive element to display with the graphical representation of the content item to allow the content item to be shared with the one or more other users in any of the plurality of content networks the processor further to:
select a highest score from the one or more scores indicative of the user's interaction with the content item; and
determine the highest score is associated with the share interactive element.

20. The non-transitory computer-readable storage medium of claim 18, wherein the one or more scores are generated using a machine learning algorithm.

\* \* \* \* \*